(12) United States Patent
Britz et al.

(10) Patent No.: US 11,060,001 B2
(45) Date of Patent: Jul. 13, 2021

(54) METHOD FOR PRODUCING A MOIST-CROSSLINKING PRESSURE-SENSITIVE ADHESIVE, MOIST-CROSSLINKING PRESSURE SENSITIVE ADHESIVE AND ADHESIVE TAPE

(71) Applicant: Lohmann GmbH & Co. KG, Neuwied (DE)

(72) Inventors: Jochen Britz, Urmitz (DE); Viktor Martens, Hanroth (DE)

(73) Assignee: Lohmann GmbH & Co. KG, Neuwied (DE)

( * ) Notice: Subject to any disclaimer, the term of this patent is extended or adjusted under 35 U.S.C. 154(b) by 0 days.

(21) Appl. No.: 16/632,514

(22) PCT Filed: Jul. 19, 2018

(86) PCT No.: PCT/EP2018/069678
§ 371 (c)(1),
(2) Date: Jan. 20, 2020

(87) PCT Pub. No.: WO2019/016332
PCT Pub. Date: Jan. 24, 2019

(65) Prior Publication Data
US 2020/0208021 A1    Jul. 2, 2020

(30) Foreign Application Priority Data

Jul. 20, 2017  (DE) .................. 10 2017 116 433

(51) Int. Cl.
| | |
|---|---|
| *C08F 2/46* | (2006.01) |
| *C08F 2/50* | (2006.01) |
| *C08G 61/04* | (2006.01) |
| *C09J 7/38* | (2018.01) |
| *C09J 143/04* | (2006.01) |

(52) U.S. Cl.
CPC .............. *C09J 7/385* (2018.01); *C09J 143/04* (2013.01); *C09J 2433/00* (2013.01)

(58) Field of Classification Search
CPC ........ C09J 7/385; C09J 143/04; C09J 183/04; C09J 2433/00; C09D 143/04; C08F 230/08; C08F 220/148; C08F 220/1818; C08K 5/57

USPC ............... 522/6, 71, 1, 189, 184; 520/1
See application file for complete search history.

(56) References Cited

U.S. PATENT DOCUMENTS

| | | |
|---|---|---|
| 4,509,949 A | 4/1985 | Huang et al. |
| 2010/0280209 A1 | 11/2010 | Braun et al. |
| 2011/0111236 A1 | 5/2011 | Pahl et al. |
| 2015/0030848 A1* | 1/2015 | Goubard .............. A61L 15/585 428/341 |

FOREIGN PATENT DOCUMENTS

| | | | |
|---|---|---|---|
| DE | 102004033728 A1 | 2/2006 | |
| EP | 2801596 A1 * | 11/2014 | ........... C09D 133/14 |
| EP | 2801596 A1 | 11/2014 | |
| JP | H04114078 A | 4/1992 | |
| WO | 9840439 A1 | 9/1998 | |

OTHER PUBLICATIONS

International Search Report and Written Opinion for corresponding application PCT/EP2018/069678, 8 pages, dated Sep. 28, 2018.
German Examination Report for corresponding application DE 10 2017 116 433.2, 5 pages, dated Mar. 21, 2018.

* cited by examiner

*Primary Examiner* — Jessica Whiteley
(74) *Attorney, Agent, or Firm* — Ohlandt, Greeley, Ruggiero & Perle, LLP

(57) ABSTRACT

The present disclosure relates to a method for producing a moist-crosslinking pressure-sensitive adhesive with adjustable adhesive properties, more particularly for producing thick layers of the moist-crosslinking pressure-sensitive adhesive, comprising the following steps: providing, by means of UV-initiated radical polymerisation, a covalently bonded pre-polymer containing alkoxysilyl-terminated monomers to provide a base material suitable for a pressure-sensitive adhesive; adding at least one catalyst to the pre-polymer; and moist-crosslinking this mass to provide a pressure-sensitive adhesive; wherein an aftertreatment of the pressure-sensitive adhesive to adjust application-specific mechanical and/or rheological properties to optimise the adhesive properties such as adhesion, cohesion, visco-elasticity and tack by means of steam and/or temperature. A corresponding moist-crosslinked pressure-sensitive adhesive and an adhesive tape is also described.

11 Claims, 6 Drawing Sheets

METHOD FOR PRODUCING A MOIST-CROSSLINKING PRESSURE-SENSITIVE ADHESIVE, MOIST-CROSSLINKING PRESSURE SENSITIVE ADHESIVE AND ADHESIVE TAPE

CROSS REFERENCE TO RELATED APPLICATION

The present application is a U.S. national stage patent application of International Patent Application No. PCT/EP2018/069678, filed on Jul. 19, 2018, and claims foreign priority to German Patent Application No. 10 2017 116 433.2 filed on Jul. 20, 2017, the entirety of each of which is incorporated by reference hereby.

BACKGROUND OF THE DISCLOSURE

Field of the Disclosure

The present disclosure relates a method for producing a moist-crosslinking pressure-sensitive adhesive, a moist-crosslinked pressure-sensitive adhesive and an adhesive tape.

Description of the Related Art

Moist-crosslinking pressure-sensitive adhesives, frequently also referred to as moist-curing pressure-sensitive adhesives or pressure-sensitive adhesives (PSA) are known in the art. It is known in the art to use moist-crosslinking pressure-sensitive adhesives as sealing agents and for coatings. Moreover, applications are known in the art where moist-crosslinking pressure-sensitive adhesives are used as elastic adhesives, in particular for use in adhesive tapes. Moist-crosslinking pressure-sensitive adhesives typically include a polymer-based base material, i.e. macro-molecules essentially in chain form as well as derivatives of such macro-molecules.

Internal stability, i.e. the cohesion properties, the generation of adhesive forces at the contact surfaces of the pressure-sensitive adhesive, i.e. adhesion, mechanical and thermal resistance and wettability, play a significant role in providing efficient adhesion of a moist cross-linking pressure-sensitive adhesive. Moist-crosslinking pressure-sensitive adhesives require both good adhesive properties so as to provide for strong adhesion to the material to be bonded and sufficient cohesion so as to ensure cohesion of the bond within the pressure-sensitive adhesive. In this context, cohesion primarily hinges upon the lateral crosslinking in the form of chemical bonds between the macro-molecules. Consequently, lateral crosslinking reactions are an essential prerequisite for efficient adhesion. As a general rule, polymers without or with only little lateral crosslinking density therefore cannot be used as pressure-sensitive adhesives due to their poor cohesion properties. High-cohesion polymers in turn only provide for little adhesion because adhesion generally deteriorates beyond a certain level of lateral crosslinking density. Consequently, the mechanical properties of a pressure-sensitive adhesive in particular depend on its adhesion to the respective surface, cohesion and the ratio between these two factors. Visco-elasticity and tack, i.e. its stickiness constitutes a further significant factor regarding the mechanical properties of a pressure-sensitive adhesive.

It is known in the art to improve the adhesive capacity of pressure-sensitive adhesives or to enhance the mechanical properties of the adhesive by mixing in certain additives.

EP 2 883 926 B1 describes a pressure-sensitive adhesive with improved adhesive strength and high shear strength by using a mixture consisting in a polymethacrylate, a synthetic rubber and a carbohydrate resin as well as a tackifier.

WO 2007/085622 A1 teaches that compositions of polymers and functional silane groups exhibit good adhesive properties also when subjected to substantial stress caused by humidity.

WO 2014/029837 A1 illustrates the use of a tetramethyl stannoxydi-carboxylate as catalyst for crosslinking silane curing compounds.

It is one disadvantage of pressure-sensitive adhesives known in the art that every pressure-sensitive adhesive, in terms of its respective properties, particularly with regard to its mechanical properties, is made for just one particular use case or a narrow range of applications to a more or less optimal extent and that it will already no longer be suitable for use cases exhibiting slightly deviating requirements, especially with respect to peel strength, shear strength or tensile strength.

SUMMARY

Described is a method is introduced for producing a moist-crosslinking pressure-sensitive adhesive with adjustable adhesive properties, more particularly for producing thick layers of the moist-crosslinking pressure-sensitive adhesive, comprising the following steps: providing, by means of UV-initiated radical polymerisation, a covalently bonded pre-polymer containing alkoxysilyl-terminated monomers to provide a base material suitable for a pressure-sensitive adhesive; adding at least one catalyst to the pre-polymer; and moist-crosslinking this mass to provide a pressure-sensitive adhesive; and an aftertreatment of the pressure-sensitive adhesive to adjust application-specific mechanical and/or rheological properties to optimise the adhesive properties such as adhesion, cohesion, visco-elasticity and tack by means of steam and/or temperature.

The aftertreatment using steam and/or temperature serves to specifically adjust the rheological and in particular the mechanical properties of the moist-crosslinking pressure-sensitive adhesive. The properties thus obtained or adjusted, respectively, are essentially maintained as such following the aftertreatment. In other words: the properties of the pressure-sensitive adhesive are "frozen" after completion of the aftertreatment. This way, in particular the pressure-sensitive adhesive properties of the pressure-sensitive adhesive such as adhesion, cohesion, visco-elasticity and tack can be adjusted specifically for the respective application. Effectively, in particular the peel strength, shear strength and/or tensile strength of the pressure-sensitive adhesive can be adjusted specifically for the respective use case and the materials that are to be bonded.

The aftertreatment, moreover, allows for achieving an essentially uniform crosslinking density also within thick layers of the pressure-sensitive adhesive. Consequently, an aftertreated pressure-sensitive adhesive is also particularly suitable to be used as a thick film pressure-sensitive adhesive.

Moist-crosslinking presently is understood in particular to be a crosslinking method. In the case of polymers containing alkoxysilyl, these form crosslinks between polymer chains in the presence of moisture. In this context, the alkoxysilane groups are initially hydrolysed into silanols. Subsequently, the silanols react with each other and bond with further alkoxysilanes, thus forming covalently bonded siloxanes whilst releasing alkanols.

In this application, a "thick layer" is considered a layer having a thickness equal to or more than 0.5 mm. Preferably, a thick layer will exhibit a thickness between 0.5 mm to 3 mm, especially preferably 0.5 mm to 1.5 mm.

According to another preferred embodiment, the share of covalently bonded alkoxysilyl-terminated monomers in the pre-polymer amounts to between 0.05 to 10% by weight, preferably 0.08 and 7% by weight and particularly preferably 0.1 and 5% by weight. Thus, a particularly favourable crosslinking density can be obtained.

In order to specify the extent of the moist-crosslinking particularly precisely, according to a preferred embodiment, the share of the catalyst contained in the pre-polymer can preferably amount to 0.001 to 10% by weight, particularly preferably 0.005 to 6% by weight and very particularly preferably 0.01 to 2% by weight, whereas the catalyst preferably includes a Lewis acid or a Lewis base, preferably a tertiary amine or an organotin compound.

In order to obtain a particularly pure polymer material, the pressure-sensitive adhesive can be produced solvent-free using moist-crosslinking and substance polymerisation. In other words: the polymerisation of the pre-polymer is effected by substance polymerisation, also referred to as block polymerisation, without using solvents. Due to the absence of a solvent, (UV) substance polymerisation is associated also with toxicological advantages compared to polymerisation involving added solvents.

In the alternative, the pressure-sensitive adhesive can also be produced using moist-crosslinking and solvent polymerisation.

Tests showed the surprising effect that, among other things, a crosslinking density of the pressure-sensitive adhesive, in particular in thick layers or when the pressure-sensitive adhesive is formed as a thick-film adhesive, respectively, can be enhanced even more if the aftertreatment for optimising the pressure-sensitive adhesive properties of the pressure-sensitive adhesive in accordance with yet another preferred embodiment is effected by applying steam, preferably at 30 to 100 g water (steam)/m$^3$ air, preferably at saturation steam pressure.

According to yet another preferred embodiment, the aftertreatment for optimising the pressure-sensitive adhesive properties of the pressure-sensitive adhesive is effected by applying an aftertreatment temperature of 60° C. to 150° C., preferably 80° C. to 125° C. and particularly preferably 120° C.

A pressure-sensitive adhesive with particularly favourable properties can be obtained if the pre-polymer is provided based on polymers including acrylate or based on silicon compounds, elastomers, preferably rubber-based, or polyurethanes and/or if the alkoxy radicals of the alkoxysilyl-terminated monomers are provided as methoxy, ethoxy, n-propoxy and/or iso-propoxy bis butoxy radicals and/or mixtures thereof.

According to a particularly preferred further embodiment, the pre-polymer is provided based on a selection of acrylate monomers, whereas the selection comprises different compositions and different proportional shares of acrylates with alkoxysilyl shares, acrylates with long-chained aliphatic shares, acrylates with short-chained aliphatic shares and acrylates with short-chained aliphatic shares as well as additionally an acid-functional group.

The object specified above, furthermore, is achieved by a moist-crosslinked pressure-sensitive adhesive comprising a covalently bonded pre-polymer containing alkoxysilyl-terminated monomers and at least one catalyst, wherein the pressure-sensitive adhesive, for adjusting application-specific mechanical and/or rheological properties to optimise the pressure-sensitive adhesive properties such as adhesion, cohesion, visco-elasticity and tack, is aftertreated by means of steam and/or temperature.

Accordingly, a moist-crosslinked pressure-sensitive adhesive is proposed, comprising a covalently bonded pre-polymer containing alkoxysilyl-terminated monomers and at least one catalyst. According to the invention, the pressure-sensitive adhesive is aftertreated to adjust application-specific mechanical and/or rheological properties to optimise the pressure-sensitive adhesive properties such as adhesion, cohesion, visco-elasticity and tack by means of steam and/or temperature.

The aftertreatment by means of steam and/or temperature allows the specific subsequent adjustment of the rheological and, in particular, the mechanical properties of the moist-crosslinking pressure-sensitive adhesive. The properties of the pressure-sensitive adhesive thus obtained or adjusted, respectively, are essentially maintained as such after completion of the aftertreatment. In other words: the properties of the pressure-sensitive adhesive are "frozen" after completion of the aftertreatment. Especially with respect to the pressure-sensitive properties of the pressure-sensitive adhesive such as adhesion, cohesion, visco-elasticity and tack and thus also peel strength, shear strength and/or tensile strength of the pressure-sensitive adhesive, the adhesive can thus be adjusted specifically to accommodate the relevant application for the respective use case in question and the materials to be bonded.

According to another preferred embodiment, the share of covalently bonded alkoxysilyl-terminated monomers in the pre-polymer amounts to between 0.05 to 10% by weight, preferably between 0.08 and 7% by weight and particularly preferably between 0.1 and 5% by weight.

According to another preferred embodiment, the share of the catalyst contained in the pre-polymer preferably amounts to 0.001 to 10% by weight, particularly preferably 0.005 to 6% by weight and very particularly preferably 0.01 to 2% by weight, whereas the catalyst preferably includes a Lewis acid or a Lewis base, preferably a tertiary amine or an organotin compound.

According to another preferred embodiment, the pressure-sensitive adhesive is produced solvent-free by means of moist-crosslinking and substance polymerisation or by means of moist-crosslinking and solvent polymerisation.

If the aftertreatment is effected in the form of applying steam, preferably at 30 to 100 g water (steam)/m$^3$ air, preferably at saturation steam pressure, the pressure-sensitive adhesive properties of the pressure-sensitive adhesive can be adjusted in a particularly favourable fashion.

Tests have shown that it is particularly advantageous to adjust the pressure-sensitive adhesive properties of the pressure-sensitive adhesive by way of an aftertreatment by applying an aftertreatment temperature of 60° C. to 150° C., preferably 80° C. to 125° C. and particularly preferably 120° C.

According to another preferred embodiment, the pre-polymer is provided based on polymers including acrylate or based on silicon compounds, elastomers, preferably rubber-based, or polyurethanes, and/or the alkoxy radicals of the alkoxysilyl-terminated monomers are provided as methoxy, ethoxy, n-propoxy and/or iso-propoxy bis butoxy radicals and/or mixtures thereof.

In order to obtain a pressure-sensitive adhesive that is particularly suited for pressure-sensitive adhesion in terms of its properties, according to a particularly preferred embodiment, the pre-polymer is provided based on a selection of acrylate monomers, whereas the selection comprises different compositions and different proportional shares of acrylates with alkoxysilyl shares, acrylates with long-chained aliphatic shares, acrylates with short-chained aliphatic shares and acrylates with short-chained aliphatic shares as well as additionally an acid-functional group.

According to another preferred embodiment, a polymerisation of the pre-polymer can be initiated by means of UV irradiation, whereas the pressure-sensitive adhesive preferably includes a photo-initiator, preferably a first photo-initiator for initiating a pre-polymerisation and/or a second photo-initiator for initiating a polymerisation during a coating.

The object specified above is also achieved by an adhesive tape utilising the features of claim 18. Advantageous further developments of the adhesive tape derive from the present description as well as the figures.

Accordingly, an adhesive tape is suggested comprising at least one layer of a moist-crosslinking pressure-sensitive adhesive tape in accordance with any of the above embodiments.

According to a particularly preferred embodiment, the pressure-sensitive adhesive layer has a layer thickness of 0.05 mm to 3 mm, preferably 0.15 mm to 2.5 mm, particularly preferably 0.25 mm to 2 mm and very particularly preferably 0.5. mm to 1.5 mm.

BRIEF DESCRIPTION OF THE DRAWINGS

Additional embodiments of the are illustrated in further detail by the subsequent description with reference to the Figures. In this.

DETAILED DESCRIPTION OF EMBODIMENTS

Figure 1:
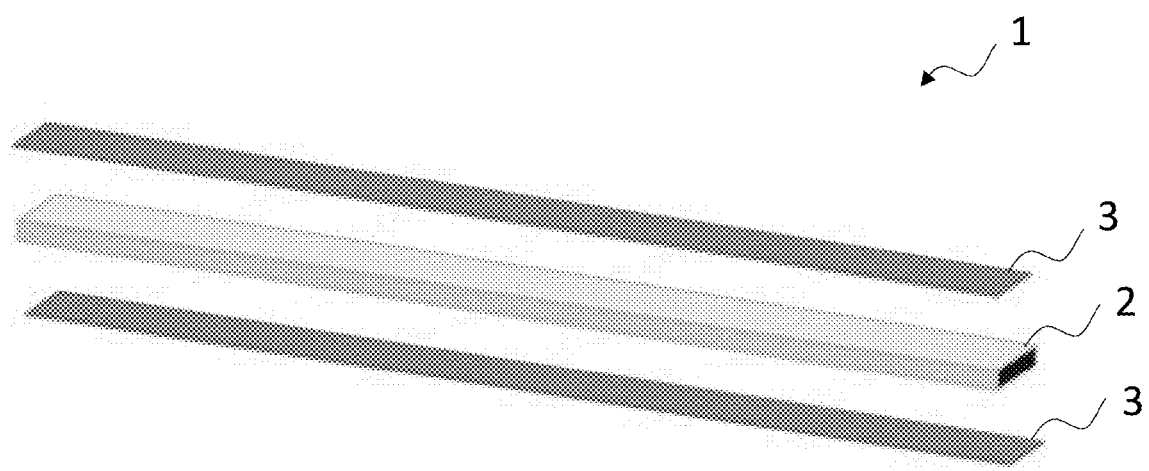
FIG. 1 shows a schematic exploded perspective view of an adhesive tape including a layer made of a moist-crosslinking pressure-sensitive adhesive.

What follows is a description of embodiments with respect to the Figures. In this, identical or similar elements or elements with the same effect are referenced with identical reference numerals in the different Figures, and these elements are not repeatedly described so as to avoid redundancies.

FIG. 1 shows a schematic exploded perspective view of a multi-purpose adhesive tape 1 including a layer 2 made of a moist-crosslinking pressure-sensitive adhesive. Here, layer 2 has a thickness of 500 μm. Alternatively, also other layer thicknesses can be provided, preferably in the range of 0.5 mm to 1.5 mm. Layer 1 is arranged in between two coatings 3 that can be pulled off and which are removed prior to application of the adhesive tape 1. I.e., the adhesive tape 1 is provided as a transfer tape.

The moist-crosslinking pressure-sensitive adhesive of layer 2 is produced by means of substance polymerisation. It comprises a base material based on covalently bonded polymers, whereas prior to the polymerisation moreover also in particular alkoxysilyl-terminated monomers were added. Table 1 shows the monomers used for the production of the pressure-sensitive adhesive according to the first embodiment.

TABLE 1

| Monomers used | |
|---|---|
| Acronym | Description |
| Monomer A | Alkoxysilyl-terminated acrylate |
| Monomer B | Acrylates with long-chained, aliphatic radicals |
| Monomer C | Acrylates with short-chained, aliphatic radicals |
| Monomer D | Acrylates with short-chained, aliphatic radicals with an additional acidic functional group |

For the production of the moist-crosslinking pressure-sensitive adhesive, in a first step pre-polymers with covalently bonded alkoxysilyls are pre-polymerised in the polymer chains. For this purpose, a (meth)acrylate comprising unsaturated alkoxysilane pursuant to the formula (I) copied in below was used.

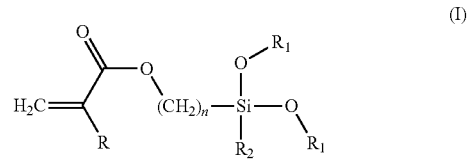

The radicals R, $R_1$ and $R_2$ according to formula (I) generally comprise short, aliphatic substituents. The alkoxysilyl ends preferably comprise methoxy, ethoxy, n-propoxy, and/or iso-propoxy-bis butoxy radicals and/or mixtures thereof.

For producing the pre-polymerisate first of all monomers A to C according to Table 1 are homogeneously mixed with a photo-initiator for initiating a pre-polymerisation at 120 revolutions per minutes for a period of 5 minutes and polymerised at 23° C. by means of UV light irradiation until 10% or, alternatively 20% have been converted.

In a second step, the pre-polymerisate thus obtained is modified with monomer D, a second photo-initiator for initiating a polymerisation during a coating as well as a catalyst in the form of an organotin compound for the moist-crosslinking, and the mixture is then homogenised by stirring for 2 minutes at 1800 revolutions per minute. Alternatively, the catalyst can also be provided in the form of a tertiary amine.

The proportional shares of the ingredients of the moist-crosslinking pressure-sensitive adhesive according to the first embodiment derive from Table 2:

TABLE 2

| Proportional share | |
|---|---|
| Ingredient | Amount relative to the total mass of the mixture |
| Monomer A | 0.2 wt. %) |
| Monomer B | 81.2 wt. %) |
| Monomer C | 12 wt. %) |
| Monomer D | 5 wt. %) |
| First photo initiator | 0.1 wt. %) |
| Second photo initiator | 0.5 wt. %) |
| Catalyst | 1 wt. %) |

The mass thus modified is applied on one of the removable coatings 3 with a thickness of 500 μm so that the layer 2 thus created is covered by the other of the two coatings 3.

In a subsequent step, the layer composite consisting in the first coating 3, the layer 1 of the pressure-sensitive adhesive and the second coating 3 thus created is passed through a UV lamp channel and is irradiated with UV radiation at a wavelength of ca. 350 nm to 400 nm at a distance of 110 mm so that the polymerisation of the pressure-sensitive adhesive layer 1 is initiated again and the polymer mass is converted up to at least 99%.

After this repeat polymerisation, one of the coatings 3 can be removed and the adhesive tape 1 thus produced can be rolled up so as to be able to provide the adhesive tape 1 in a compact form.

According to a second embodiment, an adhesive tape 1 is produced similarly to the adhesive tape in the first embodiment, whereas the content of the alkoxysilyl-terminated acrylate (monomer A) amounts to 1% by weight in relation to the total mass of the pressure-sensitive adhesive. The weight ratio of the acrylates with long-chained, aliphatic radicals is thus reduced to 80.6% by weight, accordingly.

According to a third embodiment, an adhesive tape 1 is produced in the same way as the adhesive tape in the first embodiment, whereas the content of the alkoxysilyl-terminated acrylate (monomer A) amounts to 5% by weight in relation to the total mass of the pressure-sensitive adhesive. The weight ratio of the acrylates with long-chained, aliphatic radicals is thus reduced to 76.2% by weight, accordingly.

In a subsequent processing step the adhesive tapes 1 thus obtained are subjected to an aftertreatment.

According to a first embodiment, the aftertreatment comprises an application of an aftertreatment temperature of ca. 120° C. for an aftertreatment period of 120 minutes.

As a consequence of the aftertreatment according to the first embodiment, an increased gel value could be read out compared to the moist-crosslinking pressure-sensitive adhesive prior to the aftertreatment, which constitutes a reference value for the crosslinking of the pressure-sensitive adhesive. As described above, cohesion increases as crosslinking increases.

The gel value was determined as follows. 50 ml toluene were added to 1 g of the pressure-sensitive adhesive and the mixture was stored at room temperature for two days. Afterwards the diluent, consisting in toluene and dissolved polymers, was filtrated using a nylon filter with a pore size of ca. 50 μm and then dried in an oven for about four hours at 110° C. Subsequently, the gel content was analysed with reference to weight and determined based on the following formula:

$$\text{Gel content [\%]} = \frac{\text{Weight of undissolved radical}}{\text{Weight of the pressure} - \text{sensitive adhesive}} \cdot 100$$

According to a second embodiment, the aftertreatment comprises an application of an aftertreatment temperature of about 120° C. and simultaneous application of steam for an aftertreatment time of 120 min. The higher the share of alkoxysilyl-terminated monomers in the composition, the more pronounced the crosslinking becomes during the aftertreatment.

As a consequence of the aftertreatment according to the second embodiment, an increased gel value could be read out compared to the moist-crosslinking pressure-sensitive adhesive prior to the aftertreatment, which surprisingly is [was] even higher than in the aftertreatment according to the first embodiment.

Table 3 shows the measured gel values of the adhesive tapes 1 according to the sample embodiments 1 to 3 after the aftertreatment pursuant to the first embodiment and pursuant to the second embodiment:

TABLE 3

| Gel values following the aftertreatment | | | |
|---|---|---|---|
| Concentration of the silane monomer A [wt. %] | Gel value [%] after 120 ° C., 2 h | Gel value [%] after 120 ° C., 2 h and steam treatment | Difference |
| 0.2 | 62 | 64 | 2 |
| 1 | 77 | 82 | 5 |
| 5 | 84 | 91 | 7 |

By means of the aftertreatment according to the second embodiment, crosslinking could be enhanced even more.

By varying the aftertreatment parameters, the rheological and in particular the mechanical properties of the moist-crosslinking pressure-sensitive adhesive can be specifically adjusted. Thus, the properties thus obtained or adjusted, respectively are essentially maintained as such after the aftertreatment. In other words: the properties of the pressure-sensitive adhesive are "frozen" after completion of the aftertreatment and can thus be reproduced.

FIGS. 2 to 5 show the adjusting values of the roll peel strength (FIG. 2), the shear strength (FIG. 3), the tack (FIG. 4) and the breaking tension and elongation at break (FIG. 5) of the moist-crosslinking pressure-sensitive adhesive according to the first embodiment over time during the aftertreatment.

The roll peel strength was determined according to DIN EN 1939 (2003). Accordingly, a pressure-sensitive adhesive layer with a width of 25 mm was pulled off from a clean steel testing plate at a 90° angle. The testing speed was 300 mm/min.

Figure 2:
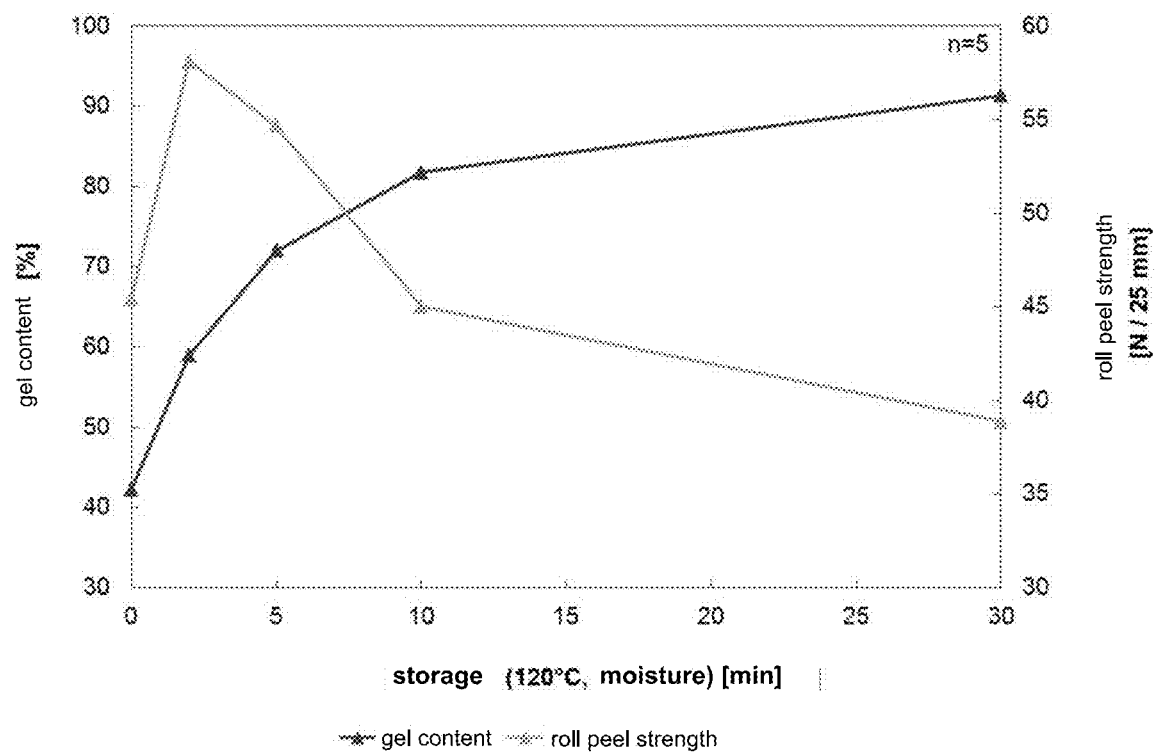
FIG. 2 shows a schematic chart of the roll peel strength of a moist-crosslinking pressure-sensitive adhesive over the course of the aftertreatment time.

As derives also from FIG. 2, the roll peel strength without aftertreatment amounts to about 45.5 N/25 mm, about 58 N/25 mm at an aftertreatment time of 2 minutes, about 54.5 N/25 mm at an aftertreatment time of 5 minutes, about 45 N/25 mm at an aftertreatment time of 10 minutes and about 38.5 N/25 mm at an aftertreatment time of 30 minutes.

To determine the shear strength of the adhesive tape 1, a 25 mm×25 mm segment was cut out of the adhesive tape and attached to two roughened and cleaned steel plates. After bonding, the plates were pressed with a 5 kg roller for 30 seconds and stored subject to a 1 kg load for 24 hours. Afterwards, the sample thus produced was sheared at a yoke speed of 10 mm/min.

Figure 3:
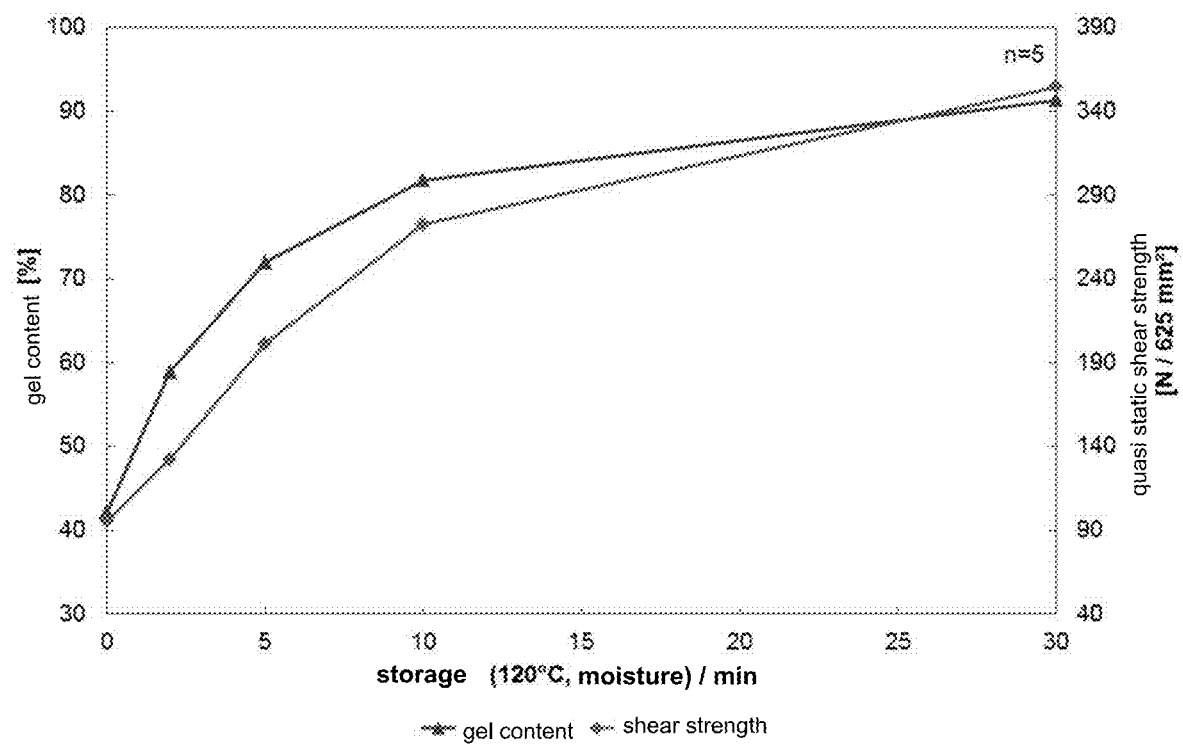
FIG. 3 shows a schematic chart of the shear strength of a moist-crosslinking pressure-sensitive adhesive over the course of the aftertreatment time.

As derives also from FIG. 3, the shear strength without aftertreatment amounts to about 41 N/625 mm², about 135 N/625 mm² at an aftertreatment time of 2 minutes, about 200 N/625 mm² at an aftertreatment time of 5 minutes, about 270 N/625 mm² at an aftertreatment time of 10 minutes and about 350 N/625 mm² at an aftertreatment time of 30 minutes.

The breaking tension and elongation at break were determined following the principles of DIN EN 53504. The adhesive tape was cut in strips of 25 mm width and 100 mm length, the coatings 3 were removed and clamped at a clamping length of 50 mm. The testing speed was 300 mm/min.

Figure 4:
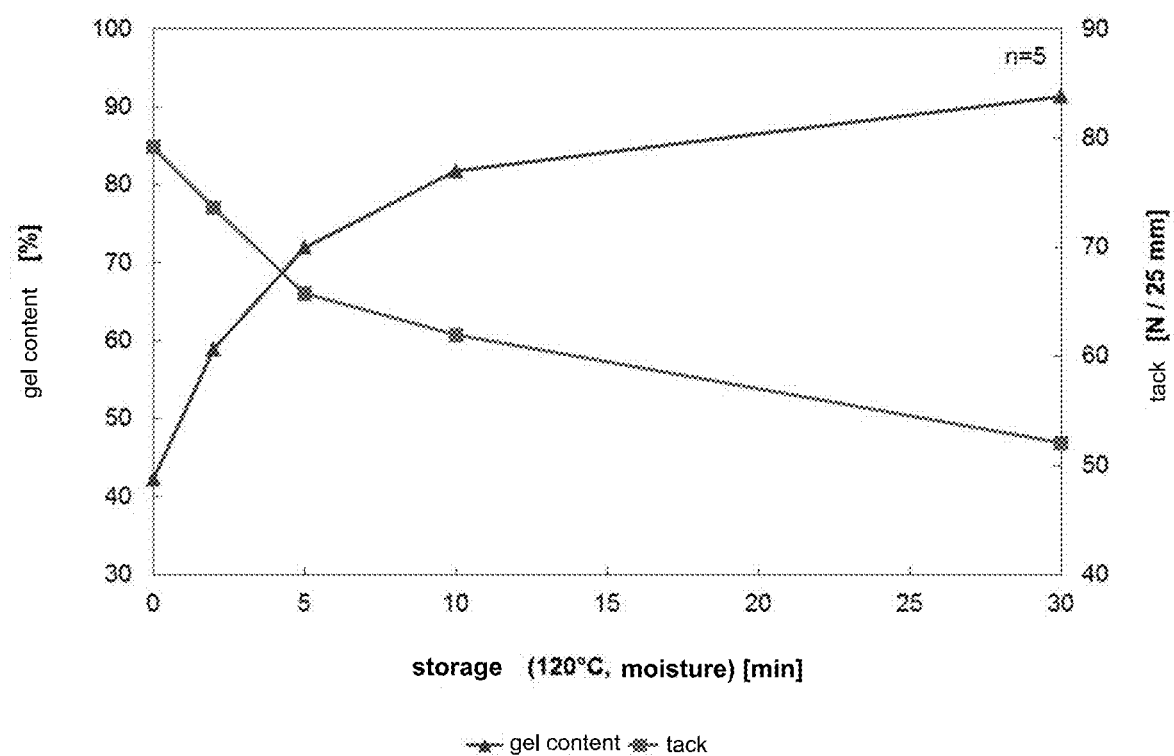
FIG. 4 shows a schematic chart of the tack of a moist-crosslinking pressure-sensitive adhesive over the course of the aftertreatment time.

As derives also from FIG. 4, the tack without aftertreatment amounts to about 85 N/25 mm, about 74 N/25 mm at an aftertreatment time of 2 minutes, about 66 N/25 mm at an aftertreatment time of 5 minutes, about 62 N/25 mm at an aftertreatment time of 10 minutes and about 52 N/25 mm at an aftertreatment time of 30 minutes.

To determine the tack, the adhesive tape 1 was cut in strips of 25 mm width and 250 mm length. After rolling up the adhesive strips, the roll thus formed and fixed was applied onto a steel plate by the test device arranged perpendicular to the testing direction and peeled off again at the same time at a speed of 100 mm/min. The mean value of the resulting forces was determined.

Figure 5:
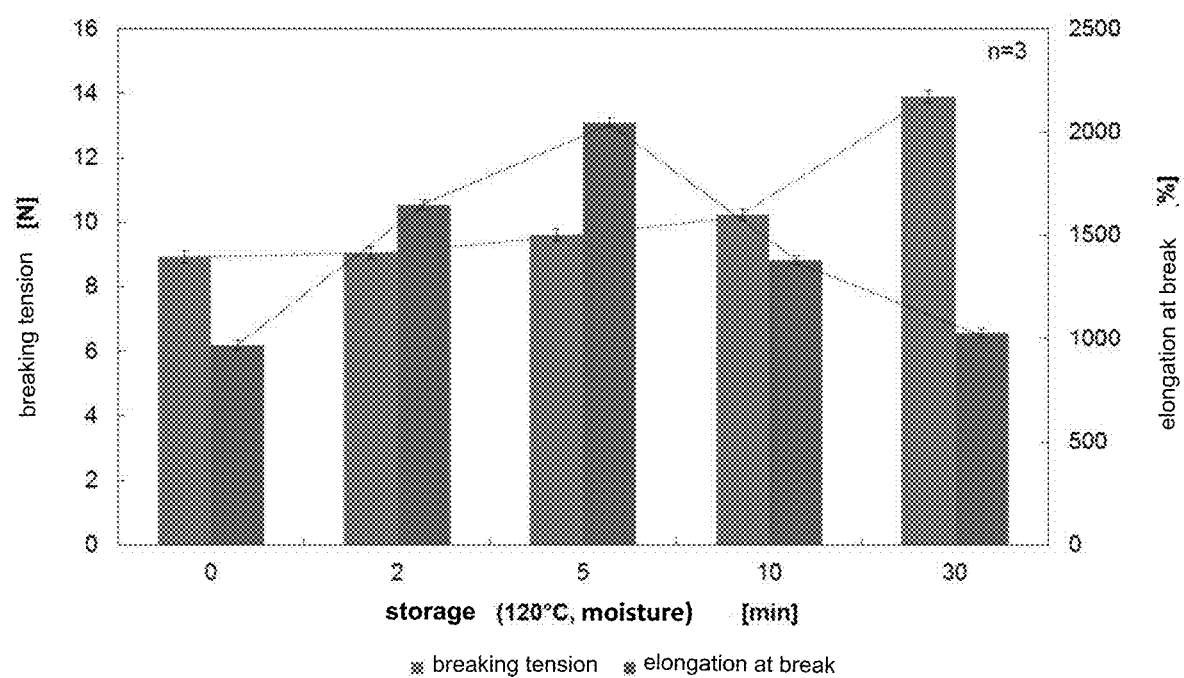
FIG. 5 shows a schematic chart of the breaking tension and elongation at break of a moist-crosslinking pressure-sensitive adhesive over the course of the aftertreatment time.

As illustrated in FIG. 5 the breaking tension and elongation at break are about 8.8 N/mm² at about 950% elongation without aftertreatment, about 9 N/mm² at about 1650% elongation at an aftertreatment time of 2 minutes, about 9.7 N/mm² at about 2100% elongation at an aftertreatment time of 5 minutes, about 10.2 N/mm² at ca. 1400% elongation at an aftertreatment time of 10 minutes and about 14 N/mm² at about 1050% elongation at an aftertreatment time of 30 minutes.

Figure 6:
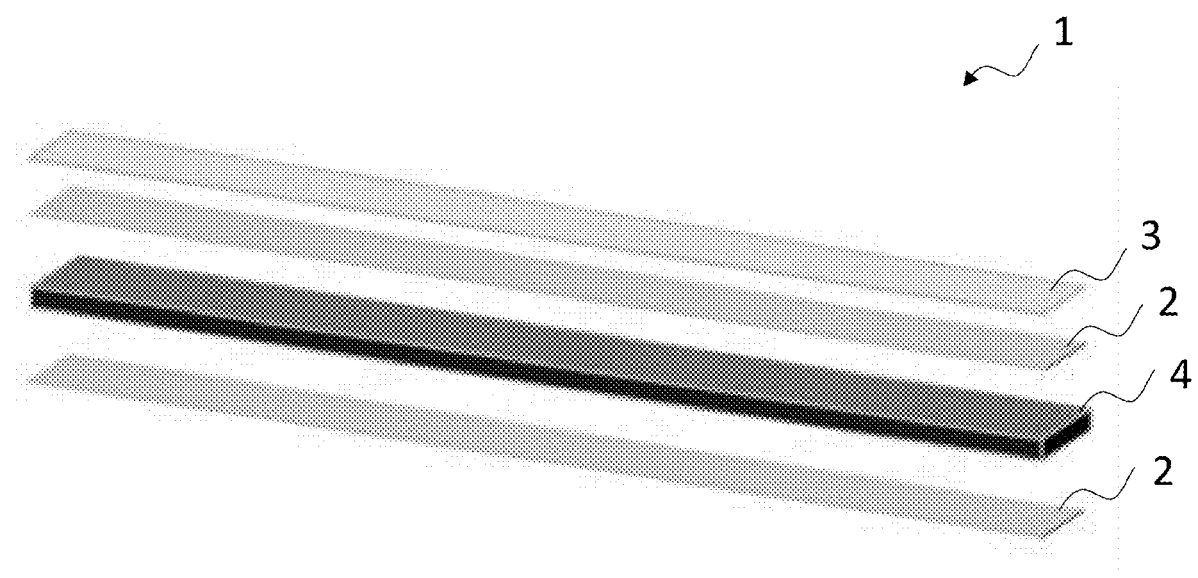
FIG. 6 shows a schematic exploded perspective view of an adhesive tape according to another embodiment.

As is immediately obvious from FIGS. 2 to 5, the mechanical properties of the moist-crosslinking pressure-sensitive adhesive and consequently adhesive tape 1 can be specifically changed and adjusted so that the adhesive tape 1 is optimised for the respective use case and purpose. FIG. 6 shows a double-sided adhesive tape 1 according to a further embodiment. Contrary to the adhesive tape 1 according to FIG. 1, in the adhesive tape according to FIG. 6, one layer 2 made of a moist-crosslinking pressure-sensitive adhesive is disposed on each side of a backing 4. One of the two layers 2 is covered with a removable siliconised coating 3 on the side facing away from the backing 4.

As far as applicable, all individual features shown in the sample embodiments can be combined and/or exchanged without leaving the scope of the invention.

LIST OF REFERENCE NUMERALS 1 adhesive tape
2 layer
3 coating
4 backing

The invention claimed is:
1. A method for producing a moist-crosslinking pressure-sensitive adhesive with adjustable pressure-sensitive adhesive properties comprising:
providing, by means of UV-initiated radical polymerisation, a covalently bonded pre-polymer containing alkoxysilyl-terminated monomers for providing a base material suitable for a pressure-sensitive adhesive;
adding at least one catalyst to the pre-polymer; and
moist-crosslinking this mass to provide a pressure-sensitive adhesive; and
applying an aftertreatment to the pressure-sensitive adhesive to adjust application-specific mechanical and/or rheological properties to optimize the pressure-sensitive adhesive properties, wherein the aftertreatment comprises a steam aftertreatment, a temperature aftertreatment, or both.

2. The method of claim 1, wherein the share of covalently bonded alkoxysilyl-terminated monomers in the pre-polymer amounts to between 0.05 to 10% by weight.

3. The method of claim 1, wherein the share of the catalyst contained in the pre-polymer preferably amounts to 0.001 to 10% by weight, and wherein the catalyst includes a Lewis acid or a Lewis base.

4. The method of claim 1, wherein the pressure-sensitive adhesive is produced solvent-free by moist-crosslinking and substance polymerisation or that the pressure-sensitive adhesive is produced by moist-crosslinking and solvent polymerisation.

5. The method of claim 1, wherein the aftertreatment for optimising the pressure-sensitive adhesive properties of the pressure-sensitive adhesive is effected by applying the steam aftertreatment at from 30 to 100 g water (steam)/m³ air.

6. The method of claim 1, wherein: the aftertreatment for optimising the pressure-sensitive adhesive properties of the pressure-sensitive adhesive comprises applying an aftertreatment temperature of 60° C. to 150° C.

7. The method of claim 1, wherein:
the pre-polymer is provided based on polymers including acrylate or based on silicon compounds, elastomers, or poly-urethanes and/or that the alkoxy radicals of the alkoxysilyl-terminated monomers are provided as methoxy, ethoxy, n-propoxy and/or iso-propoxy bis butoxy radicals and/or mixtures thereof.

8. The method of claim 1, wherein the pre-polymer is provided based on a selection of acrylate monomers, the selection being selected from different compositions and different proportional shares of acrylates with alkoxysilyl shares, acrylates with long-chained aliphatic shares, acrylates with short-chained aliphatic shares, and acrylates with short-chained aliphatic shares as well as an acid-functional group.

9. The moist-crosslinked pressure-sensitive adhesive according of claim 1, wherein the pre-polymer is provided based on polymers including acrylate or based on silicon compounds, elastomers, or poly-urethanes and/or that the alkoxy radicals of the alkoxysilyl-terminated monomers are provided as methoxy, ethoxy, n-propoxy and/or iso-propoxy bis butoxy radicals and/or mixtures thereof.

10. The method of claim 2, wherein the share of covalently bonded alkoxysilyl-terminated monomers in the pre-polymer amounts to 0.08 and 7%.

11. The method of claim 10, wherein the share of covalently bonded alkoxysilyl-terminated monomers in the pre-polymer amounts to 0.1 and 5% by weight.

* * * * *